US010374755B2

(12) United States Patent
Park

(10) Patent No.: US 10,374,755 B2
(45) Date of Patent: Aug. 6, 2019

(54) METHOD AND APPARATUS OF SCHEDULING FOR DEVICE TO DEVICE (D2D) COMMUNICATION

(71) Applicant: Innovative Technology Lab Co., Ltd., Seoul (KR)

(72) Inventor: Dong Hyun Park, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 46 days.

(21) Appl. No.: 14/708,083

(22) Filed: May 8, 2015

(65) Prior Publication Data

US 2015/0327288 A1    Nov. 12, 2015

(30) Foreign Application Priority Data

May 9, 2014    (KR) .................... 10-2014-0055812

(51) Int. Cl.
H04W 4/70      (2018.01)
H04W 72/12     (2009.01)
H04L 1/08      (2006.01)
H04W 52/04     (2009.01)
H04W 72/14     (2009.01)
(Continued)

(52) U.S. Cl.
CPC .............. H04L 1/08 (2013.01); H04W 4/70 (2018.02); H04W 52/04 (2013.01); H04W 72/1205 (2013.01); H04W 72/1289 (2013.01); H04W 52/262 (2013.01); H04W 52/383 (2013.01); H04W 72/1278 (2013.01); H04W 72/14 (2013.01); H04W 92/18 (2013.01)

(58) Field of Classification Search
CPC .. H04L 5/0032; H04W 72/042; H04W 76/021

USPC ........................................................ 370/329
See application file for complete search history.

(56) References Cited

U.S. PATENT DOCUMENTS 9,775,135 B2 *  9/2017  Seo ................. H04W 28/06
2010/0238823 A1 *  9/2010  Chen ................ H04L 1/1822
                                                  370/252
(Continued)

OTHER PUBLICATIONS

"3rd Generation Partnership Project; Technical Specification Group Radio Access Network; Evolved Universal Terrestrial Radio Access (E-UTRA); Physical layer procedures (Release 12)," 3GPP TS 36.213, Mar. 2014, pp. 1-186, V12.1.0, 3GPP Organizational Partners, Valbonne, France.

(Continued)

Primary Examiner — Asad M Nawaz
Assistant Examiner — Berhanu D Belete

(57) ABSTRACT

Exemplary embodiments provide a method and apparatus for supporting a device-to-device (D2D) communication between user equipments (UEs), the method including: generating, at an evolved NodeB (eNB), D2D scheduling assignment (D2D SA) grant; transmitting the generated D2D SA grant to a transmission (Tx) UE, the D2D SA grant enabling the Tx UE to transmit an SA to a reception (Rx) UE through a D2D communication; generating, at the eNB, a D2D data grant; transmitting the generated D2D data grant to the Tx UE, the D2D data grant enabling the Tx UE to transmit a Transport Block (TB) to the Rx UE; generating a separate grant for indicating data overriding; and transmitting the generated separate grant to the Tx UE, the separate grant enabling the Tx UE to transmit an overriding data to the Rx UE.

18 Claims, 9 Drawing Sheets

(51) Int. Cl.
*H04W 52/26* (2009.01)
*H04W 52/38* (2009.01)
*H04W 92/18* (2009.01)

(56) References Cited

U.S. PATENT DOCUMENTS

| | | | | |
|---|---|---|---|---|
| 2011/0026622 A1* | 2/2011 | Luo | H04L 1/1614 | 375/260 |
| 2012/0275391 A1* | 11/2012 | Cui | H04W 72/1247 | 370/329 |
| 2013/0182671 A1* | 7/2013 | Kakishima | H04B 7/0417 | 370/329 |
| 2013/0188590 A1* | 7/2013 | Aiba | H04L 1/1861 | 370/329 |
| 2013/0195122 A1* | 8/2013 | Li | H04L 1/0026 | 370/479 |
| 2013/0258996 A1* | 10/2013 | Jung | H04W 72/1284 | 370/330 |
| 2013/0322413 A1* | 12/2013 | Pelletier | H04W 72/1289 | 370/336 |
| 2014/0003262 A1* | 1/2014 | He | H04W 28/08 | 370/252 |
| 2014/0023008 A1* | 1/2014 | Ahn | H04W 76/023 | 370/329 |
| 2014/0064203 A1* | 3/2014 | Seo | H04W 28/06 | 370/329 |
| 2014/0086158 A1* | 3/2014 | Tavildar | H04L 1/1607 | 370/329 |
| 2014/0185530 A1* | 7/2014 | Kuchibhotla | H04W 4/90 | 370/329 |
| 2014/0187283 A1* | 7/2014 | Nimbalker | H04W 72/048 | 455/550.1 |
| 2014/0302791 A1* | 10/2014 | Mok | H04W 52/383 | 455/41.2 |
| 2015/0043385 A1* | 2/2015 | Noh | H04W 24/02 | 370/255 |
| 2015/0078279 A1* | 3/2015 | Ko | H04L 1/1861 | 370/329 |
| 2015/0110038 A1* | 4/2015 | Yang | H04W 72/042 | 370/329 |
| 2015/0163689 A1* | 6/2015 | Lee | H04W 76/14 | 370/328 |
| 2015/0173048 A1* | 6/2015 | Seo | H04W 72/1247 | 370/329 |
| 2015/0189642 A1* | 7/2015 | Yang | H04L 1/1861 | 370/311 |
| 2015/0249981 A1* | 9/2015 | Wu | H04W 24/10 | 370/329 |
| 2015/0271807 A1* | 9/2015 | Patil | H04W 76/023 | 455/426.1 |
| 2015/0271846 A1* | 9/2015 | Kowalski | H04W 72/14 | 370/329 |
| 2015/0271860 A1* | 9/2015 | Baghel | H04W 76/14 | 455/426.1 |
| 2015/0326360 A1* | 11/2015 | Malladi | H04L 5/0032 | 370/329 |
| 2016/0021680 A1* | 1/2016 | Choi | H04W 52/0216 | 370/311 |
| 2016/0183276 A1* | 6/2016 | Marinier | H04W 72/02 | 370/329 |
| 2016/0249355 A1* | 8/2016 | Chae | H04W 72/1263 | |
| 2017/0013596 A1* | 1/2017 | van Phan | H04W 72/02 | |
| 2017/0027014 A1* | 1/2017 | Chae | H04B 7/2656 | |
| 2017/0041932 A1* | 2/2017 | Chae | H04W 72/04 | |
| 2017/0048829 A1* | 2/2017 | Kim | H04L 5/00 | |
| 2017/0164381 A1* | 6/2017 | Kim | H04W 72/12 | |
| 2017/0181186 A1* | 6/2017 | Seo | H04W 72/042 | |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)," 3GPP Ts 36.321, Mar. 2014, pp. 1-57, V12.1.0, 3GPP Organizational Partners, Valbonne, France.

Qualcomm Inc., "eNB resource allocation for D2D broadcast communication", R1-141451, 3GPP TSG RAN WG1 Meeting #76bis, Shenzhen, China, Mar. 31-Apr. 4, 2014, pp. 1-6, 3GPP.

Ericsson, "Overview of D2D functions and standardization impact", R1-140771, 3GPP TSG RAN WG1 Meeting #76, Prague, Czech Republic, Feb. 10-14, 2014, pp. 1-7, 3GPP.

Ericsson, "On Scheduling Assignments and Receiver Behaviour", R1-141391, 3GPP TSG-RAN WG1 Meeting #76bis, Shenzhen, China, Mar. 31-Apr. 4, 2014, pp. 1-6, 3GPP.

International Search Report for International Patent Application No. PCT/KR2015/004653 dated Aug. 19, 2015.

Written Opinion for International Patent Application No. PCT/KR2015/004653, dated Aug. 19, 2015.

\* cited by examiner

METHOD AND APPARATUS OF SCHEDULING FOR DEVICE TO DEVICE (D2D) COMMUNICATION

CROSS-REFERENCE TO RELATED APPLICATIONS

This application claims priority from and the benefit of Korean Patent Application No. 10-2014-0055812, filed on May 9, 2014, which is hereby incorporated by reference in its entirety.

BACKGROUND

1. Field

Exemplary embodiments relate to a wireless communication, and more particularly, to a scheduling method and apparatus for device-to-device (D2D) communication.

2. Discussion of the Background

Device-to-device (D2D) communication relates to a communication method having been available since the era of an analog two-way radio and has been used over the very long history. However, D2D communication in a wireless communication system is distinguished from existing D2D communication.

The D2D communication in the wireless communication system indicates communication that uses a transmission and reception technology, for example, a physical channel, of the wireless communication system in a frequency band of the wireless communication system or a band excluding the frequency band, and in this instance, enables user data to be directly transmitted and received between devices, for example, user equipments (UEs) without using an infrastructure, for example, an evolved-NodeB (eNB). That is, two UEs function as a source and a destination of data, respectively, and perform communication. Such a method enables wireless communication to be available in an area outside a limited wireless communication infrastructure and also decreases network load of the wireless communication system.

The D2D communication may be performed through a communication method of using an unlicensed band of a wireless local area network (WLAN), such as Institute of Electrical and Electronics Engineers (IEEE) 802.11, or Bluetooth. However, the communication method using the unlicensed band may not readily provide a planned and controlled service. In particular, performance may be significantly degraded due to interference. On the other hand, D2D communication operated or provided in a licensed band or an inter-system interference controlled environment may support the relatively high quality of service (QoS), may improve the frequency use efficiency through a frequency reuse, and may also increase a communicable distance.

In the case of D2D communication using the licensed band, that is, D2D communication based on cellular communication, resources for D2D communication may be allocated through an eNB. For example, cellular uplink (UL) channels or UL subframes may be used as resources to be allocated. The D2D communication includes D2D data communication and D2D control signal communication. To support the D2D communication, the eNB may need to perform resource indication for D2D communication and control information signaling for D2D data transmission. However, detailed scheduling and control information signaling for D2D communication has not been developed so far.

SUMMARY

An exemplary embodiment provides a scheduling method and apparatus for device-to-device (D2D) communication.

An exemplary embodiment provides a method and apparatus for resource indication and control information signaling for D2D communication.

An exemplary embodiment provides a method and apparatus for data overriding for D2D communication.

An exemplary embodiment discloses a method of supporting a device-to-device (D2D) communication between user equipments (UEs), the method including: generating, at an evolved NodeB (eNB), D2D scheduling assignment (D2D SA) grant; transmitting the generated D2D SA grant to a transmission (Tx) UE, the D2D SA grant enabling the Tx UE to transmit an SA to a reception (Rx) UE through a D2D communication; generating, at the eNB, a D2D data grant; transmitting the generated D2D data grant to the Tx UE, the D2D data grant enabling the Tx UE to transmit a Transport Block (TB) to the Rx UE; generating a separate grant for indicating data overriding; and transmitting the generated separate grant to the Tx UE, the separate grant enabling the Tx UE to transmit an overriding data to the Rx UE.

An exemplary embodiment discloses a method of supporting a device-to-device (D2D) communication between user equipments (UEs), the method including: receiving, at a transmission (Tx) UE, D2D scheduling assignment (D2D SA) grant transmitted from an evolved NodeB (eNB), the D2D SA grant enabling the Tx UE to transmit an SA to a reception (Rx) UE through a D2D communication; receiving, at the Tx UE, a D2D data grant transmitted from the eNB, the D2D data grant enabling the Tx UE to transmit a Transport Block (TB) to the Rx UE; based on the D2D SA grant, transmitting SA#0 to the Rx UE on a first multiple transmission opportunity (MTO) with repetition; based on the D2D data grant, transmitting TB#0 to the Rx UE on a second MTO with repetition; receiving, at the Tx UE, a separate grant for indicating data overriding; based on the separate grant, overriding the transmission of SA#0 with SA#1 from a first time point in the first MTO; and overriding the transmission of TB#0 with TB#1 from a second time point in the second MTO.

An exemplary embodiment discloses an evolved NodeB (eNB) to support a device-to-device (D2D) communication between user equipments (UEs), the eNB including: a processor configured to generate D2D scheduling assignment (D2D SA) grant and generate a D2D data grant; and a radio frequency unit to transmit the generated D2D SA grant to a transmission (Tx) UE and transmit the generated D2D data grant to the Tx UE, the D2D SA grant enabling the Tx UE to transmit an SA to a reception (Rx) UE through a D2D communication, the D2D data grant enabling the Tx UE to transmit a Transport Block (TB) to the Rx UE. The processor is configured to generate a separate grant for indicating data overriding, and the RF unit transmits the generated separate grant to the Tx UE, the separate grant enabling the Tx UE to transmit an overriding data to the Rx UE.

An exemplary embodiment discloses a transmission user equipment (Tx UE) to perform a device-to-device (D2D) communication with a reception UE (Rx UE), the Tx UE including: a radio frequency unit to receive D2D scheduling assignment (D2D SA) grant transmitted from an evolved NodeB (eNB) and receive a D2D data grant transmitted from the eNB, the D2D SA grant enabling the Tx UE to transmit an SA to a reception (Rx) UE through a D2D communication, the D2D data grant enabling the Tx UE to transmit a Transport Block (TB) to the Rx UE; and a processor configured to transmit, based on the D2D SA grant, SA#0 to the Rx UE on a first multiple transmission opportunity (MTO) with repetition; and transmit, based on the D2D data grant, TB#0 to the Rx UE on a second MTO with repetition. The radio frequency unit receives a separate grant for indicating data overriding; based on the separate grant, the processor is configured to override the transmission of SA#0 with SA#1 from a first time point in the first MTO; and the processor is configured to override the transmission of TB#0 with TB#1 from a second time point in the second MTO.

According to one or more exemplary embodiments, when performing device-to-device (D2D) communication, it is possible to support flexible scheduling and to efficiently support the D2D communication.

DETAILED DESCRIPTION OF THE ILLUSTRATED EMBODIMENTS

Figure 1:
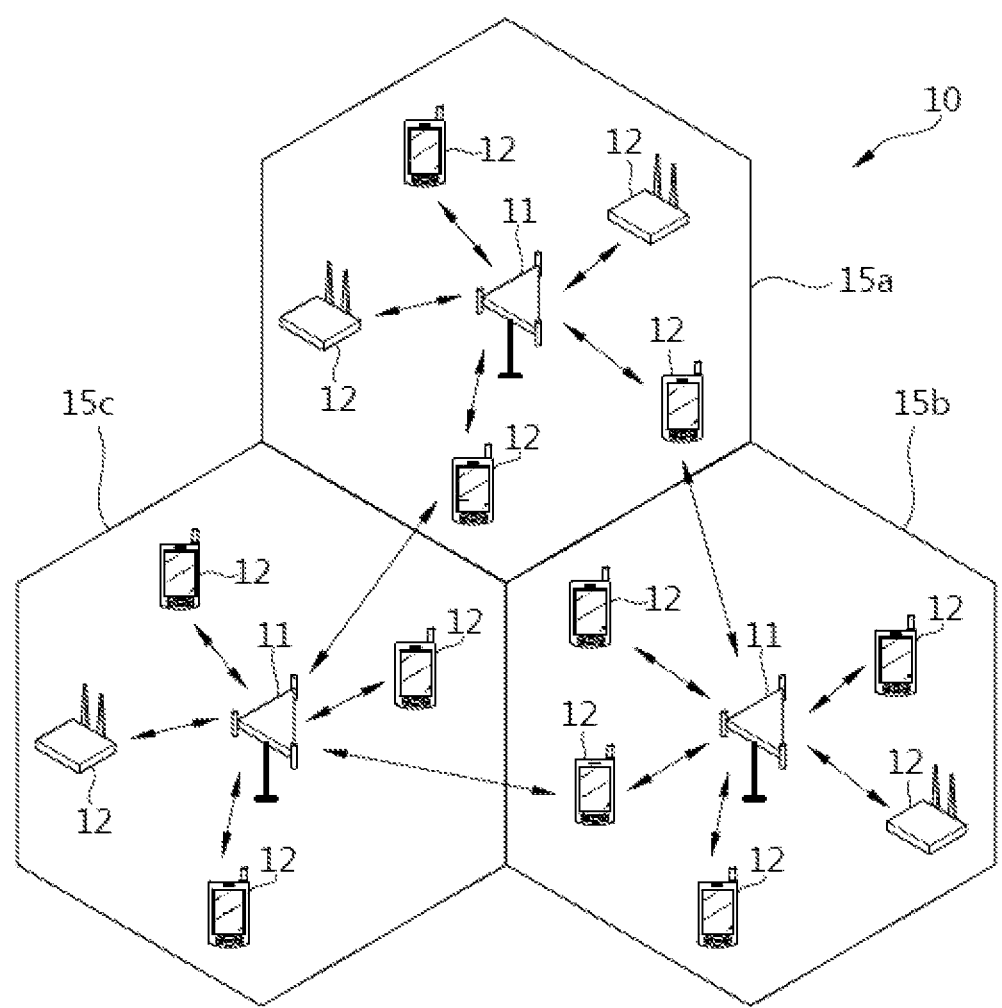
FIG. 1 is a block diagram illustrating a wireless communication system according to one or more exemplary embodiment.

Exemplary embodiments will be described more fully hereinafter with reference to the accompanying drawings, in which exemplary embodiments of inventive concept are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present.

FIG. 1 illustrates a wireless communication system according to one or more exemplary embodiment.

Referring to FIG. 1, the wireless communication system 10 is widely located to provide a variety of communication services such as a voice service and a packet data service. The wireless communication system 10 includes one or more evolved-NodeBs (eNBs) 11.

Each eNB 11 provides a communication service to a predetermined cell, for example, cells 15a, 15b, and 15c. Here, the cell may be divided into a plurality of areas (also, referred to as sectors).

User equipment 12 (UE) may be located at a certain location or portable, and may also be referred to as different terms, including MS (mobile station), MT (mobile terminal), UT (user terminal), SS (subscriber station), wireless device, PDA (personal digital assistant), wireless modem, and handheld device. An eNB 11 may also be referred to as BS (Base Station), BTS (Base Transceiver System), Access Point, femto base station, Home nodeB, relay and the like. A cell inclusively refers to various coverage areas, such as mega cell, macro cell, micro cell, pico cell, and femto cell. A cell may be used as a term for indicating a frequency band that a BS provides, a coverage of a BS, or a BS.

Hereinafter, the term downlink refers to communication from a base station 11 to a UE 12, and the term uplink refers to communication from a UE 12 to a base station 11. For downlink, a transmitter may be part of a base station 11, and a receiver may be part of a UE 12. For uplink, a transmitter may be part of a UE 12 and a receiver may be part of a base station 11. There is no limitation in the multiple access method applied to a wireless communication system. Diverse methods can be used, including CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA. Uplink transmission and downlink transmission can use either TDD (Time Division Duplex), which uses different time locations for transmissions, or FDD (Frequency Division Duplex), which uses different frequencies for transmissions.

The layers of a radio interface protocol between a UE and a BS may be classified as a first layer (L1), a second layer (L2), and a third layer (L3), based on three low layers of an Open System interconnection (OSI) model, which is well known in association with a communication system. A physical layer belonging to the L1 among the layers, provides a information transfer service using a physical channel. A physical layer is connected to a media access control (MAC) layer corresponding to an upper layer through a transport channel. Data is transferred between the MAC layer and the physical layer through the transport channel. The transport channel is classified based on a method used to transport data through a radio interface. Further, data is transferred between different physical layers, for example, between a physical layer of a user equipment (UE) and a physical layer of an eNB through a physical channel. The physical channel may be modulated using an orthogonal frequency division multiplexing (OFDM) method and uses, as radio resources, a time, a frequency, and a space generated with a plurality of antennas.

Figure 2:
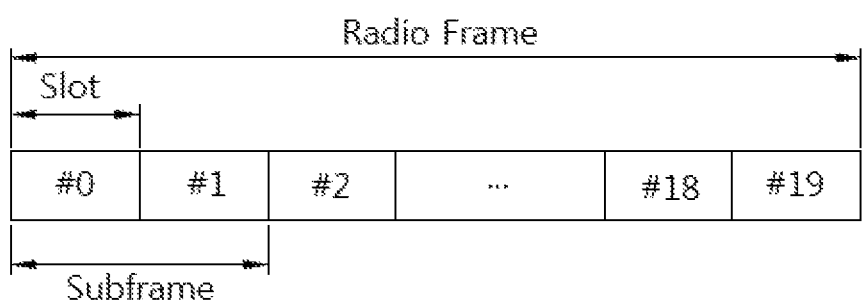
FIG. 2 and FIG. 3 are diagrams schematically illustrating a structure of a Radio Frame (RF) according to one or more exemplary embodiments.
Figure 3:
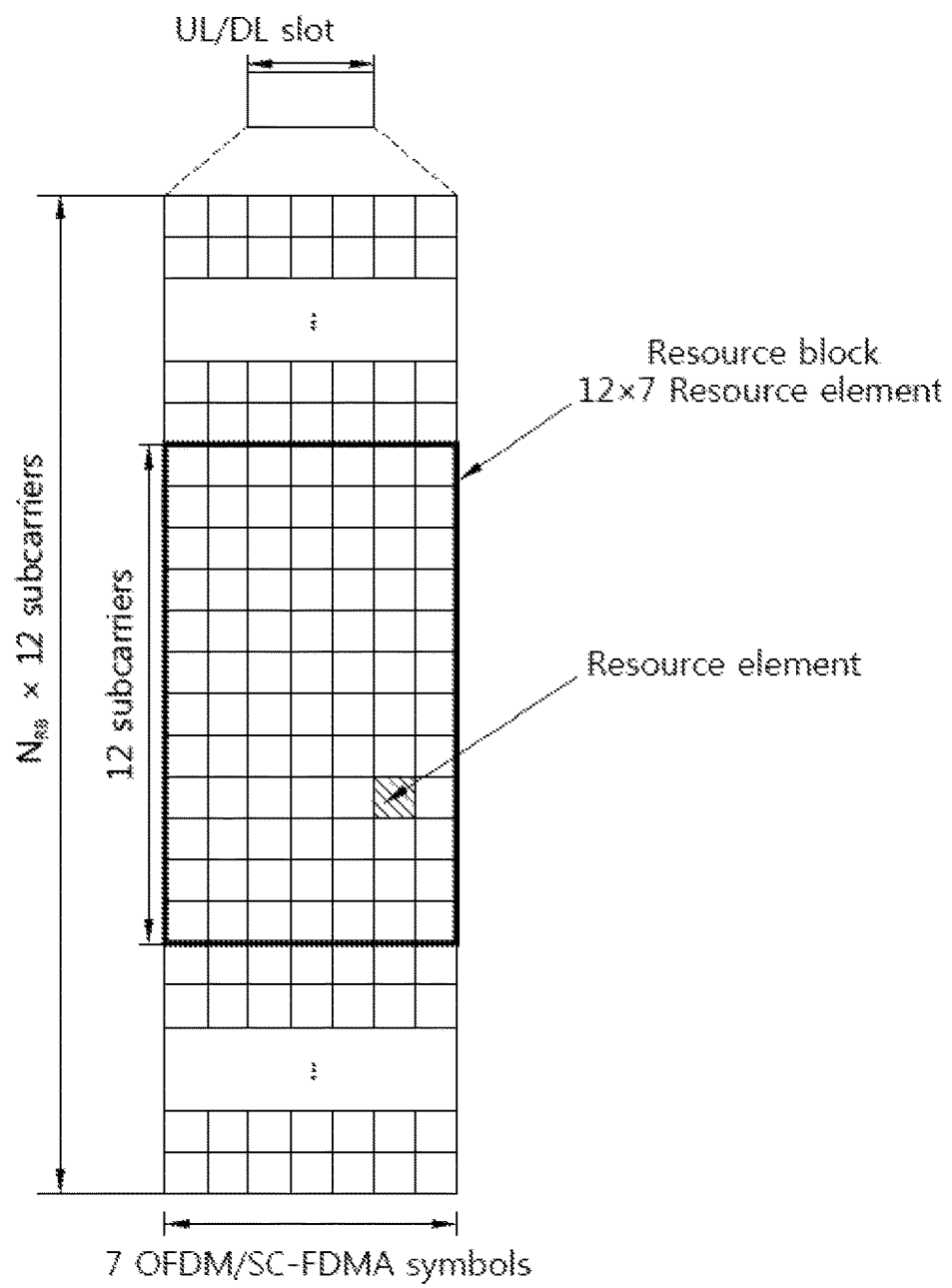

FIG. 2 and FIG. 3 are diagrams schematically illustrating a structure of a Radio Frame (RF) according to one or more exemplary embodiments.

Referring to FIG. 2 and FIG. 3, a radio frame may include ten subframes. A single subframe includes two slots. A time (a length) in which a single subframe is transmitted is referred to as a Transmission Time Interval (TTI). Referring to FIG. 2, for example, a length of a single subframe (1 subframe) may be 1 ms, and a length of a single slot (1 slot) may be 0.5 ms.

A single slot may include a plurality of symbols in a time domain. For example, in a wireless system that uses Orthogonal Frequency Division Multiple Access (OFDMA) in a Downlink (DL), the symbol may be an Orthogonal Frequency Division Multiplexing (OFDM) symbol and in a wireless system that uses Single Carrier-Frequency Division Multiple Access (SC-FDMA) in an Uplink (UL), the symbol may be an SC-FDMA symbol. An expression associated with a symbol period of the time domain may not be limited by a multiple access scheme or name.

The number of symbols included in a single slot may be different based on a length of a Cyclic Prefix (CP). For example, in the case of a normal CP, seven symbols are included in a single slot, and in the case of an extended CP, six symbols are included in a single slot.

A Resource Element (RE) may be the smallest unit of a time-frequency resource to which a modulated symbol of a data channel, a modulated symbol of a control channel, or the like is mapped, and is a resource corresponding to a single symbol in the time domain and a single subcarrier in the frequency domain. A Resource Block (RB) is a resource allocation unit, and may be a time-frequency resource corresponding to 180 kHz in a frequency axis and a single slot in a time axis.

Various physical channels may be used at a physical layer, and the physical channels (data corresponding to the physical channels) may be mapped to the radio frame and transmitted. As a downlink physical channel, PDCCH (Physical Downlink Control Channel)/EPDCCH (Enhanced PDCCH) informs a UE of a resource allocation of Paging Channel (PCH) and Downlink Shared Channel (DL-SCH) and information of Hybrid Automatic Repeat reQuest (HARQ) associated with DL-SCH. PDCCH/EPDCCH transfers an uplink grant, which informs a UE of a resource allocation of an uplink transmission. PDCCH and EPDCCH are different with respect to mapping resource regions. Physical DL-SCH is mapped to Downlink Shared Channel (PDSCH). Physical Control Format Indicator Channel (PCFICH) informs a UE of the number of OFDM symbols used for PDCCH, and is transmitted in every subframe. Physical Hybrid ARQ Indicator Channel (PHICH) is a downlink channel and transfers an HARQ ACK (Acknowledgement)/NACK (Non-acknowledgement) signal, which is a response to an uplink transmission. HARQ ACK/NACK signal may be referred to as HARQ ACK signal.

As an uplink physical channel, Physical Random Access Channel (PRACH) transfers a random access preamble. Physical Uplink Control Channel (PUCCH) transfers uplink control information, such as HARQ ACK as a response to a downlink transmission, Channel State Information (CSI) to indicate a channel state of a downlink channel, e.g., Channel Quality Indicator (CQI), Precoding Matrix Index (PMI), Precoding Type Indicator (PTI), Rank Indicator (RI), and the like.

Uplink data may be transmitted on a PUSCH, and the uplink data may be a transport block (TB) that is a data block for a UL-SCH transmitted during a transmission time interval (TTI). The TB may include user data. Further, the uplink data may be multiplexed data. In the multiplexed data, the TB for the UL-SCH and uplink control information may be multiplexed. That is, when user data to be transmitted through an uplink is present, the UL control information may be multiplexed together with the user data and be transmitted through the PUSCH.

Recently, a method of supporting D2D communication that uses a transmission and reception technology of a wireless communication system in a frequency band of the wireless communication system or a band excluding the frequency band, and in this instance, enables user data to be directly transmitted and received between devices, for example, UEs without using an infrastructure, for example, an eNB, is in consideration. The D2D communication enables wireless communication to be available in an area outside of a limited wireless communication infrastructure and may also decrease network load of the wireless communication system. Also, the D2D communication may transmit disaster-related information to UEs even in a situation in which eNBs are not in normal operation due to, for example, a war and a disaster.

A UE to transmit a signal based on D2D communication is defined as a transmit UE (Tx UE) and a UE to receive a signal based on D2D communication is defined as a receive UE (Rx UE). The Tx UE may transmit a discovery signal and the Rx UE may receive the discovery signal. Roles of the Tx UE and the Rx UE may be switched. A signal transmitted from the Tx UE may be received by at least two Rx UEs. According to one or more exemplary embodiments, in D2D communication, a first UE transmits data and a control signal through an uplink resource and a second UE receives the uplink data and the control signal transmitted from the first UE. Accordingly, an SC-FDMA symbol may be used to construct a physical channel for carrying the data and the control signal.

Figure 4:
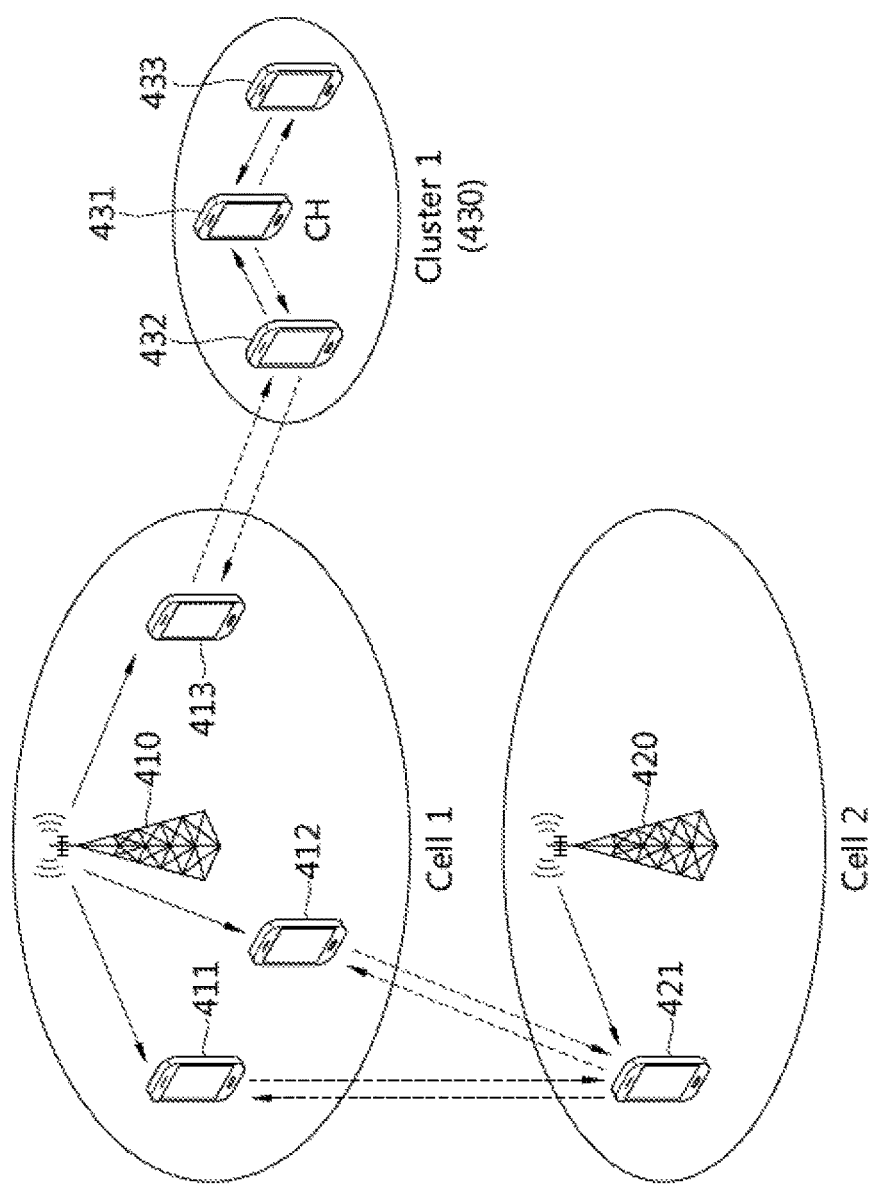
FIG. 4 illustrates an example of D2D communication based on a cellular network according to one or more exemplary embodiments.

FIG. 4 illustrates an example of D2D communication based on a cellular network according to one or more exemplary embodiments.

Referring to FIG. 4, a cellular communication network including a first eNB 410, a second eNB 420, and a first cluster 430 is configured. A first UE 411 and a second UE 412 located in a cell covered by the first eNB 410 perform communication through a general connection link, for example, a cellular link through the first eNB 410, which corresponds to an in-coverage-single-cell D2D communication scenario. The first UE 411 located in a coverage of the first eNB 410 performs D2D communication with a fourth UE 421 located in a coverage of the second eNB 420, which corresponds to an in-coverage-multi-cell D2D communication scenario. Also, a fifth UE 431 out of the network coverage may generate a single cluster, for example, the first cluster 430 together with a sixth UE 432 and a seventh UE 433 and may perform D2D communication with the sixth UE 432 and the seventh UE 433, which corresponds to an out-of-coverage D2D communication scenario. Further, a third UE 413 may perform D2D communication with the sixth UE 432, which corresponds to a partial-coverage D2D communication scenario. A D2D communication link may be generated between devices having the same cell as a serving cell, between devices having different cells as serving cell, between a device connected to a serving cell and a device not connected thereto, or between devices not connected to a serving cell. In particular, D2D communication may be used for devices located outside of the network coverage for the public safety.

Related control information may be transmitted and received between UEs to perform D2D data transmission and reception through D2D communication. The related control information may be referred to as scheduling assignment (SA). An Rx UE may perform a configuration for D2D data reception based on the SA. The SA may include at least one of, for example, a new data indicator (NDI), a transmit UE identification (Tx UE ID), a redundancy version (RV)

indicator, a modulation and coding scheme (MCS) indication, a resource allocation (RA) indication, and a power control indication.

Here, the NDI indicates whether a current transmission is repetition of data, that is, retransmission of the data or new data transmission. A receiver may combine the same data based on the NDI. The Tx UE ID indicates an ID of a Tx UE. The RV indicator indicates a redundancy version by specifying different start points in a circular buffer for reading an encoded buffer. The Tx UE may choose different redundancy versions about repetition of the same packet based on the RV indicator. The MCS indication indicates an MCS level for D2D communication. The RA indication indicates a time/frequency physical resource allocated to transmit corresponding D2D data. The power control indication may be a command for controlling a magnitude of power to be suitable for a UE having receiving corresponding data to perform corresponding D2D transmission.

An uplink channel of the wireless communication system, for example, a cellular communication system, may be used as a radio resource for D2D communication with respect to a UE supporting the D2D communication. In this example, SA and data for the D2D communication may be transmitted based on the architecture of a PUSCH among uplink physical channels of the wireless communication system. Specifically, the architecture of the PUSCH may be reused for a physical channel for D2D communication. For example, a 24-bit cyclic redundancy check (CRC) may be inserted into the physical channel for the D2D communication and turbo coding may be used for the physical channel. Further, rate matching may be used for bit-size matching and generating multiple transmissions. Scrambling may be used for interference randomization. A PUSCH demodulation reference signal (DMRS) may be used. A DMRS is used for channel estimation for coherent demodulation of an uplink received signal.

From the perspective of a Tx UE, the Tx UE may operate in two modes for resource allocation.

Mode 1 refers to a case in which an eNB or a relay node (hereinafter, the eNB may include the relay node) schedules a predetermined resource(s) for D2D communication. That is, in Mode 1, a predetermined resource(s) used for transmitting D2D data and D2D control information (SA) of the Tx UE is designated by the eNB or the relay node. Mode 2 refers to a case in which a predetermined resource(s) is selected directly from a resource pool. That is, in Mode 2, the Tx UE may directly allocate a predetermined resource(s) for transmitting D2D data and D2D control information.

A UE capable of performing D2D communication ("D2D capable UE") supports at least Mode 1 for in-coverage D2D communication. The D2D capable UE supports at least Mode 2 for out-of-coverage D2D communication or edge-of-coverage D2D communication.

D2D communication may include unicast communication, groupcast communication, and broadcast communication. In this example, a Tx UE to perform D2D broadcast communication may be referred to as a broadcasting UE. For the D2D broadcast communication, SA indicating a location of resource(s) used to receive an associated physical channel for carrying D2D data may need to be transmitted by the broadcasting UE. The resource(s) may be implicitly and/or explicitly indicated based on a SA resource or content of the SA.

In Mode 1, a location of resource(s) used for transmission of SA and a location of resource(s) used for transmission of D2D data by the broadcasting UE are assigned from an eNB. For example, a D2D SA grant and a D2D data grant are assigned from the eNB to a Tx UE. Here, the D2D SA grant instructs the Tx UE to transmit the D2D SA and the D2D data grant instructs the Tx UE to transmit D2D data. The D2D data grant may be transmitted concurrently with or separately from the D2D SA grant. The D2D SA grant and the D2D data grant may be transmitted through a PDCCH/EPDCCH.

In Mode 2, a resource pool for SA may be pre-configured and/or semi-statically allocated. In this example, a Tx UE may select a resource for the SA from the resource pool to transmit the SA.

When the Tx UE is positioned out of the coverage, resources for D2D broadcast data are selected from the resource pool. In this example, the resource pool may be pre-configured or semi-statically allocated.

The Tx UE may need to inform at least one D2D Rx UE about control information (SA) associated with D2D data prior to transmitting the D2D data to the at least one Rx UE using one of broadcast, groupcast, and unicast methods. Currently, due to characteristics of a D2D communication link, HARQ-ACK feedback is not supported with respect to at least D2D broadcast communication, and the D2D communication link is in a half-duplex constraint state. That is, concurrent transmission and reception on the same time or subframe is not supported. A multiple transmission opportunity (MTO) may be defined for reliable and flexible D2D communication in the above-noted environment. A single or a plurality of SA and/or data transmissions may be performed within a single MTO. That is, within a single MTO, the same SA and/or data may be repetitively transmitted and different or multiple SA and/or data may be transmitted. Here, different or multiple SA and/or data being transmitted includes a case in which all of the SA and/or data transmitted within the MTO differ from each other and a case in which only a portion of the SA and/or the data differs. The MTO may be referred to as a multiple SA transmission opportunity when it corresponds to SA transmission, and may be referred to as a multiple data transmission opportunity when it corresponds to data transmission.

Further, a resource pattern for transmission (RPT), a pattern of time and/or frequency resources for an MTO, may be used. Here, the RPT may be used for each of the SA transmission and the data transmission.

For example, in the case of control information about D2D communication, SA corresponding to the control information may be transmitted using a resource corresponding to an RPT. Here, with respect to an RPT, a pattern of time and/or frequency resources for the MTO, a single SA or a plurality of SAs may be transmitted in a single RPT.

Further, in the case of data for D2D communication, a data TB, a transport unit of the data, may be transmitted using a resource corresponding to an RPT. Here, with respect to an RPT, a pattern of time and/or frequency resources for the MTO, a single data TB or a plurality of data TBs may be transmitted in a single RPT.

With respect to D2D Mode 1 resource allocation, an RPT may be implicitly or explicitly signaled by the eNB or the relay node. Also, with respect to Mode 1 and Mode 2 resource allocations, an RPT for the data TB may be signaled through SA.

To effectively support D2D communication, resource allocation for D2D SA and D2D data and scheduling thereof may be provided.

A scheduling method considering D2D communication and a control signal transfer method for D2D communication are provided for an eNB to efficiently use resources within the cell coverage when the eNB schedules a predetermined resource(s) for D2D communication as in Mode 1.

In particular, due to characteristics of D2D communication, repetitive transmission of SA and/or data within an MTO is supported. In a situation in which a connection between a Tx UE and an Rx UE is configured to transmit D2D data, transmission of new D2D data may be required. In this case, to improve the transmission efficiency and to support effective D2D communication, data overriding may be performed and the new D2D data may be transmitted through data overriding during repetitive transmission of the existing D2D data. Through data overriding, it is possible to support further efficient scheduling and resource utilization in a D2D communication environment. Hereinafter, a procedure for performing the data overriding will be further described.

1. A method of supporting data overriding scheduling based on a separate grant:

A separate grant may be used for D2D communication in order to support data overriding. The separate grant may be referred to as a second D2D data grant.

Figure 5:
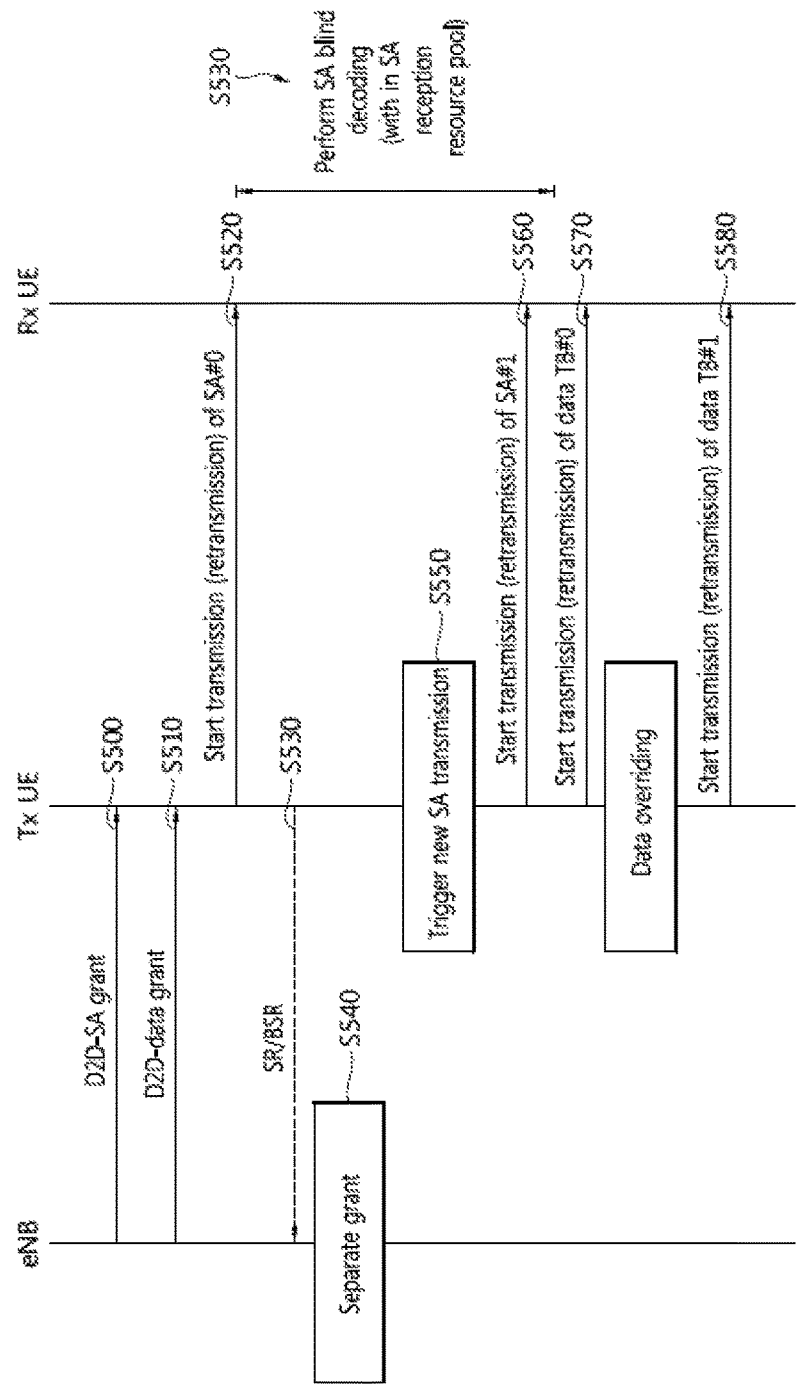
FIG. 5 illustrates a scheduling method for data overriding according to one or more exemplary embodiments.

FIG. 5 illustrates a scheduling method for data overriding according to one or more exemplary embodiments.

Referring to FIG. 5, an eNB transmits a D2D SA grant to a Tx UE in operation S500 and transmits a D2D data grant to the Tx UE in operation S510. Here, the D2D SA grant may indicate a repetitive transmission start of SA#0 in a first MTO. Also, the D2D SA grant may instruct the Tx UE to start repetitive transmission of TB#0 to an Rx UE.

The Tx UE starts transmission of control information, for example, SA#0, for transmission of D2D data, for example, data TB#0, indicated by the D2D data grant within an MTO, for example, a first MTO indicated by the D2D SA grant. Accordingly, for the D2D SA transmission, the Tx UE receives, from the eNB, and decodes in advance the D2D SA grant and the D2D data grant. The D2D SA grant and the D2D data grant may be transmitted through a PDCCH/ EPDCCH.

In operation S520, the Tx UE starts transmission (retransmission) of SA#0 to an Rx UE on an RPT indicated by the D2D SA grant. SA#0 includes a resource allocation indication about data TB#0. The Tx UE may transmit SA#0 at least once within the first MTO for SA transmission. The Tx UE may transmit SA#0 to the Rx UE on the RPT within the first MTO based on the D2D SA grant.

In operation S530, the Rx UE performs blind decoding to detect SA#0 transmitted from the Tx UE. The Rx UE may perform blind decoding within the first MTO and may receive or detect SA#0 at least once.

The Rx UE analyzes SA by performing blind decoding of an uplink channel for D2D communication within a SA resource pool. For example, blind decoding includes verifying whether a PUSCH, a group channel through which SA is transferred, relates to its own SA by de-masking a unique identifier (RNTI), for example, D2D-RNTI, from CRC of PUSCHs (candidate PUSCHs) used for reception and by performing a CRC error check, or detecting its own SA by determining whether control information corresponds to a corresponding UE based on an ID, for example, a Tx UE ID or a target ID, within the corresponding SA. The Rx UE may receive, from the eNB in advance, signaling, for example, RRC signaling, of information about the SA resource pool. The Rx UE may be informed of a plurality of SA resource pools in advance. Here, the SA resource pool includes the first MTO.

In operation S540, the eNB transmits a separate grant for data overriding to the Tx UE. As an example, the Tx UE may transmit a scheduling request (SR) message or a buffer state report (BSR) message to the eNB in operation S535. In response to the SR message or the BSR message, the eNB may transmit a separate grant for additional D2D data transmission to the Tx UE. As another example, without explicitly receiving the SR message or the BSR message, an eNB may implicitly determine the necessity of data overriding and may transmit the separate grant to the Tx UE. The separate grant may be transmitted through a PDCCH/EPDCCH.

The separate grant instructs the Tx UE to perform data overriding. Here, data overriding may include indicating transmission of SA#1 instead of transmission of SA#0 from a first point in time of the first MTO and indicating transmission of TB#1 instead of transmission of TB#0 from a second point in time of a second MTO.

For example, the separate grant may include an overriding flag bit. In this example, if the bit is '0', the separate grant may be recognized as a data grant indicating scheduling information for new TB transmission based on a new MTO. That is, if the bit is '0', the separate grant may be treated equally as a general D2D data grant. If the bit is '1', the separate grant indicates the new TB transmission in a data MTO, for example, the second MTO, indicated by the existing D2D data grant. In this example, a portion of transmission opportunities in the indicated data MTO may be used for the new TB transmission.

Further, for example, the separate grant may implicitly indicate using the same RPT as an RPT about data TB#0 indicated by the D2D data grant received in advance with respect to a new data TB, for example, data TB#1. Specifically, the D2D data grant may include an RPT for transmission of TB#0 in the second MTO, and the separate grant may implicitly indicate using the RPT for TB#1. Here, even in this case, control information about new data TB#1 may differ from control information about existing TB#0. The new data TB may reuse a resource location indicated to be used for the existing data TB.

The separate grant instructs the Tx UE to perform data overriding. Here, data overriding may include indicating transmission of SA#1 instead of transmission of SA#0 from the first point in time of the first MTO and indicating transmission of TB#1 instead of transmission of TB#0 from the second point in time of the second MTO.

For example, the separate grant may include an overriding flag bit. In this example, if the bit is '0', the separate grant may be recognized as a grant indicating scheduling information for new TB transmission based on a new MTO. That is, if the bit is '0', the separate grant may be treated equally as the general D2D SA grant. If the bit is '1', the separate grant indicates the new TB transmission in a data MTO, for example, the second MTO, indicated by the existing D2D data grant. In this example, a portion of transmission opportunities in the indicated data MTO may be used for the new TB transmission.

Further, for example, the separate grant may implicitly indicate using the same RPT as an RPT about data TB#0 indicated by the D2D data grant received in advance with respect to a new data TB, for example, data TB#1. Specifically, the D2D data grant may include an RPT for transmission of TB#0 in the first MTO, and the separate grant may implicitly indicate using the RPT for TB#1. Here, even in this case, control information about new data TB#1 may differ from control information about existing TB#0. The new data TB may reuse a resource location indicated to be used for the existing data TB.

The separate grant may include scheduling information about transmission of new data TB (data TB#1). The scheduling information includes information about, for example, a MCS, a transmission power control (TPC), and a timing alignment (TA).

Further, the separate grant may indicate a transmission opportunity of an MTO, for example, the second MTO, for data in which data overriding is to be performed. As an example, the separate grant may include a field about a data overriding location, and may indicate a transmission opportunity of the MTO, for example, the second MTO, for data in which data overriding is to be performed, using a value of the field. As another example, the data overriding location may be indicated in advance through upper layer signaling. In this case, for example, the data overriding location may be a location from a transmission opportunity after an n-th subframe after receiving the separate grant, or may be a location from a k-th transmission opportunity starting with a first transmission opportunity or a last transmission opportunity among transmission opportunities of the second MTO. For example, when a predetermined RPT is applied to the second MTO and the predetermined RPT indicates four transmission opportunities, k may indicate any one of 1 through 4.

In operation S550, the Tx UE triggers a new SA transmission based on the separate grant. That is, the Tx UE triggers transmission of new SA#1 to the Rx UE to configure data overriding based on the separate grant. In this instance, from which transmission opportunity within the first MTO SA#1 is to be transmitted may be indicated based on a predetermined timing correlation. For example, SA#1 may be transmitted from a transmission opportunity after an m-th subframe after receiving the separate grant. In detail, when the first MTO includes four transmission opportunities and a third transmission opportunity is present after the m-th subframe after receiving the separate grant, the transmission of SA#1 may start from the third transmission opportunity within the first MTO.

In operation S560, the Tx UE starts transmission (retransmission) of SA#1 to the Rx UE based on the separate grant. The Tx UE starts transmission of SA#1 from a predetermined transmission opportunity within the first MTO, instead of transmitting SA#0. The Rx UE may receive each of SA#0 and SA#1 at least once within transmission opportunities of the first MTO.

The Rx UE receives SA#1. For example, the Rx UE may detect that not SA#0 but new SA#1 is received based on a DMRS. As an example, the Rx UE may detect that SA#1 is received based on a cyclic shift (CS)/orthogonal cover code (OCC) value of the DMRS. As another example, the Rx UE may detect that SA#1 is received based on scrambling/descrambling of the DMRS.

Further, the Rx UE may detect that SA#1 is received based on a plurality of SA resource pools being preset. The Rx UE may detect SA#1 based on an RPT or a sub-RPT. For example, when the Rx UE performs blind decoding and as a result, an RPT about a resource location at which new SA is detected differs from an RPT about SA#0, the Rx UE may determine that the new SA is not SA#0 but SA#1.

In operation S570, the Tx UE starts transmission (retransmission) of data TB#0 to the Rx UE. The Tx UE may transmit TB#0 at least once within the second MTO for data transmission. The Rx UE may receive TB#0 based on the received SA#0.

In operation S580, the Tx UE starts transmission (retransmission) of overridden data TB#1 to the Rx UE within the second MTO based on the separate grant. The Rx UE may receive TB#1 within the second MTO based on the received SA#1.

Figure 6:
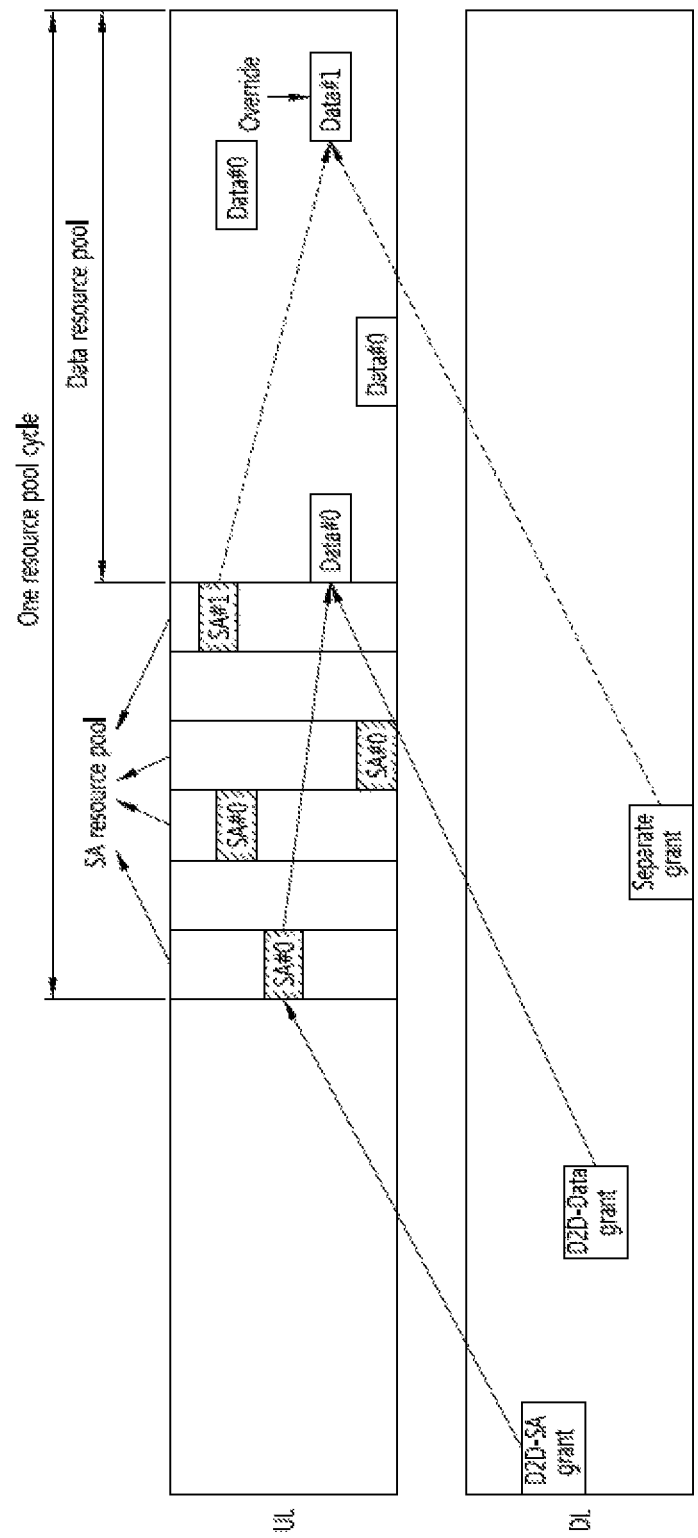
FIG. 6 illustrates a signaling flow of physical resources according to one or more exemplary embodiments.

FIG. 6 illustrates a signaling flow of physical resources according to one or more exemplary embodiments. The signaling flow of FIG. 6 is illustrated based on a physical channel of a Tx UE supporting D2D communication.

Referring to FIG. 6, the Tx UE receives a D2D SA grant from an eNB through a downlink (DL) and acquires resource information about a SA transmission opportunity based on the D2D SA grant. Here, the SA transmission opportunity may be included in a first MTO. In addition, the Tx UE receives a D2D data grant from the eNB through the DL and acquires resource information about a data transmission opportunity based on the D2D data grant. Here, the data transmission opportunity may be included in a second MTO.

The Tx UE starts transmission (retransmission) of SA#0 in the SA transmission opportunity through an uplink (UL).

The Tx UE receives a separate grant from the eNB through the DL, and triggers transmission of new SA#1 to an Rx UE in order to configure data overriding based on the separate grant. A resource location for transmission of SA#1 may be indicated based on a predetermined timing correlation. In this configuration, the Tx UE transmits SA#1 in a fourth transmission opportunity among transmission opportunities of the MTO within a SA resource pool.

The Tx UE starts transmission of data TB#0 in the data transmission opportunity through the UL based on the D2D data grant and starts transmission of data TB#1 from a predetermined resource location of the data transmission opportunity based on the separate grant. The Rx UE may receive the data TB#0 based on the SA#0 and may receive the data TB#1 based on the SA#1.

2. A method of supporting data overriding scheduling by a Tx UE:

Dissimilar to the aforementioned embodiment, the Tx UE may autonomously support data overriding scheduling without receiving a separate grant from an eNB.

Figure 7:
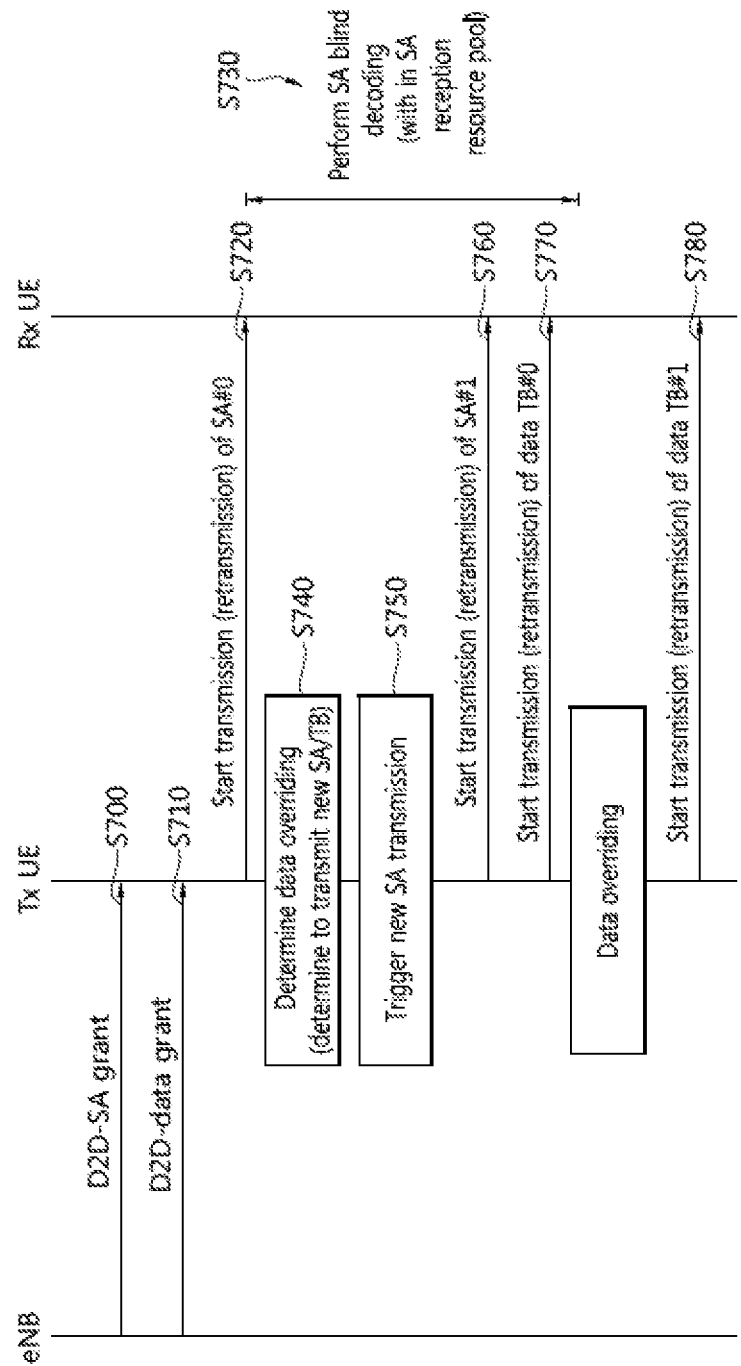
FIG. 7 illustrates a scheduling method for data overriding according to one or more exemplary embodiments.

FIG. 7 illustrates a scheduling method for data overriding according to one or more exemplary embodiments.

Referring to FIG. 7, an eNB transmits a D2D SA grant to a Tx UE in operation S700, and transmits a D2D data grant to the Tx UE in operation S710. Here, the D2D SA grant includes information about a first MTO for transmission of SA#0. Also, the D2D data grant includes information about a second MTO for transmission of data TB#0.

In operation S720, the Tx UE starts transmission (retransmission) of SA#0 to an Rx UE based on the D2D SA grant. SA#0 includes a resource allocation indication about data TB#0.

In operation S730, the Rx UE performs blind decoding to detect SA#0 transmitted from the Tx UE. The Rx UE may perform blind decoding within the first MTO and may receive or detect SA#0 at least once.

In operation S740, the Tx UE determines data overriding. In this case, the Tx UE may autonomously determine to transmit a new TB, for example, TB#1 based on a resource allocation about TB#0. The Tx UE determines to transmit new SA, for example, SA#1 associated with the TB#1 that is the new TB.

In operation S750, the Tx UE triggers a new SA transmission based on the overriding determination. That is, the Tx UE triggers transmission of new SA#1 to the Rx UE to configure data overriding based on the overriding determination.

As an example, the Tx UE may perform the new SA transmission using a resource set in advance through upper layer signaling. In this example, the set resource may be based on a different SA resource pool or a different RPT.

As another example, the Tx UE may perform the new SA transmission using a random resource within SA transmission opportunities of the first MTO indicated by the D2D SA grant.

As another example, the Tx UE may perform the new SA transmission only using a resource at a predetermined location within the SA transmission opportunities of the first MTO indicated by the D2D SA grant.

In operation S760, the Tx UE starts transmission (retransmission) of SA#1 to the Rx UE. The SA#1 carries control information about a new TB, for example, TB#1.

The Rx UE receives the SA#1. For example, the Rx UE may detect that not the SA#0 but the new SA#1 is received based on a DMRS. As an example, the Rx UE may detect that SA#1 is received based on a CS/OCC value of the DMRS. As another example, the Rx UE may detect that SA#1 is received based on scrambling/descrambling of the DMRS.

Further, the Rx UE may detect that SA#1 is received based on a plurality of preset SA resource pools being preset. Further, the Rx UE may detect SA#1 based on an RPT or a sub-RPT. For example, when the Rx UE performs blind decoding and as a result, an RPT about a resource location at which new SA is detected differs from an existing RPT about SA#0, the Rx UE may determine that the new SA is not SA#0 but SA#1.

In operation S770, the Tx UE starts transmission (retransmission) of data TB#0 to the Rx UE. The Tx UE may transmit TB#0 at least once within the second MTO for data transmission. The Rx UE may receive the TB#0 based on the received SA#0.

In operation S780, the Tx UE starts transmission (retransmission) of data overridden TB#1 to the Rx UE within the second MTO based on the separate grant. The Rx UE may receive the TB#1 within the second MTO based on the received SA#1.

Figure 8:
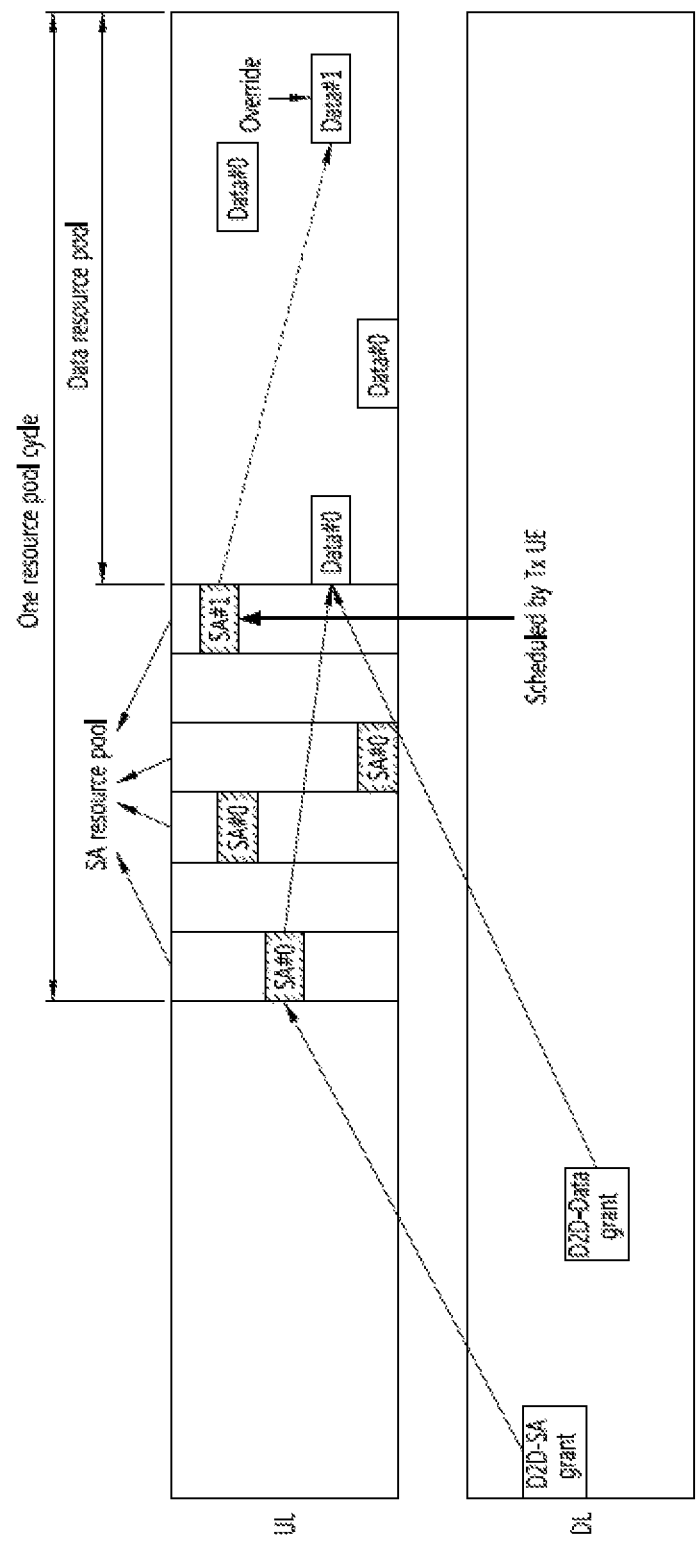
FIG. 8 illustrates a signaling flow of physical resources according to one or more exemplary embodiments.

FIG. 8 illustrates a signaling flow of physical resources according to one or more exemplary embodiments. The signaling flow of FIG. 8 is illustrated based on a physical channel of a Tx UE supporting D2D communication.

Referring to FIG. 8, the Tx UE receives a D2D SA grant from an eNB through a downlink (DL) and acquires resource information about a SA transmission opportunity based on the D2D SA grant. Here, the SA transmission opportunity may be included in a first MTO. In addition, the Tx UE receives a D2D data grant from the eNB through the DL and acquires resource information about a data transmission opportunity based on the D2D data grant. Here, the data transmission opportunity may be included in a second MTO.

The Tx UE starts transmission (retransmission) of SA#0 in the SA transmission opportunity through an uplink (UL). The Tx UE determines data overriding and triggers transmission of new SA#1 to an Rx UE. A resource location for transmission of SA#1 may be indicated using the aforementioned various methods. In this configuration, the Tx UE transmits SA#1 in a fourth transmission opportunity among transmission opportunities of the MTO within a SA resource pool.

The Tx UE starts transmission of data TB#0 in the data transmission opportunity through the UL based on the D2D data grant and starts transmission of data TB#1 from a predetermined resource location of the data transmission opportunity based on the data overriding determination. That is, in this case, the data TB#1 is overridden. The Rx UE may receive the data TB#0 based on the SA#0 and may receive the data TB#1 based on the SA#1.

According to one or more exemplary embodiments, when performing D2D communication, it is possible to support flexible scheduling and to efficiently support the D2D communication.

Figure 9:
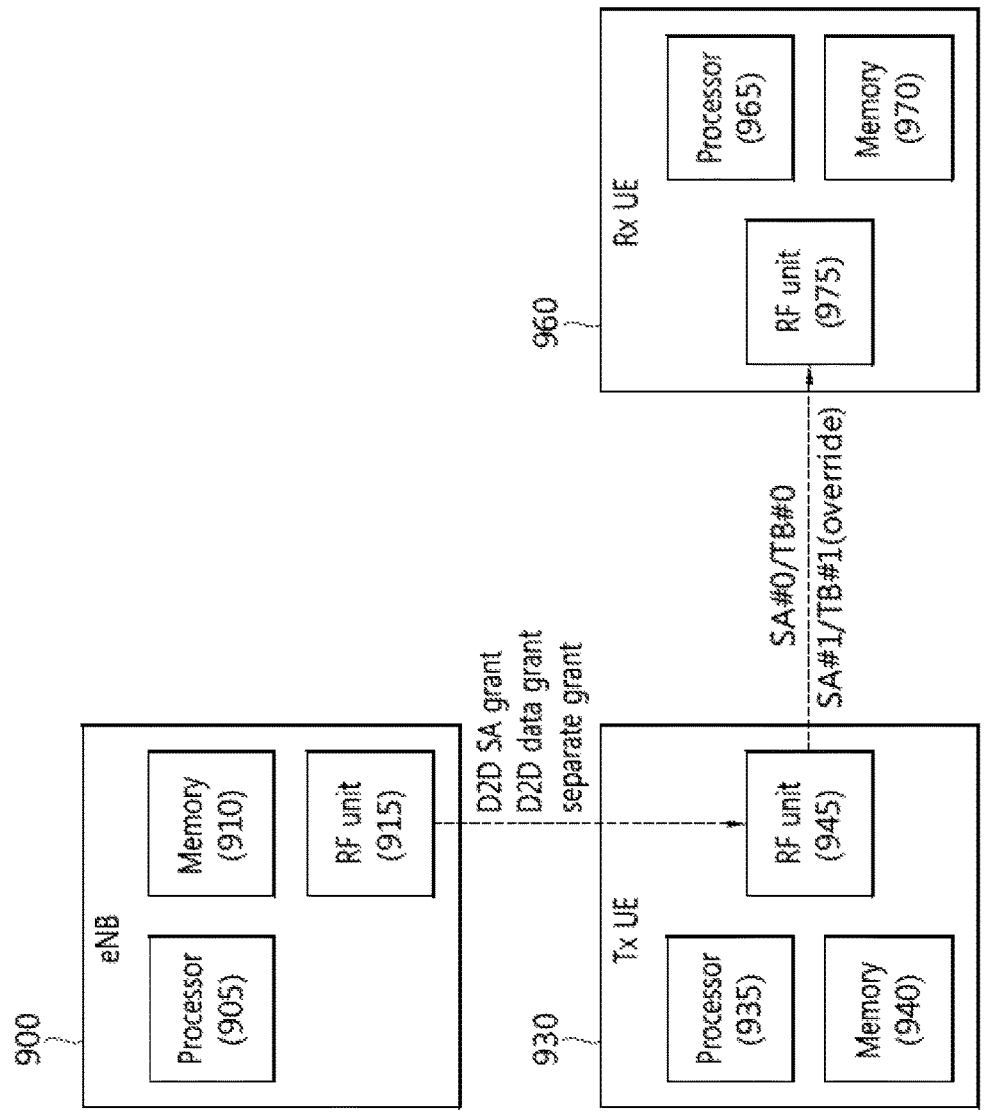
FIG. 9 is a block diagram illustrating a wireless communication system supporting D2D communication according to one or more exemplary embodiments.

FIG. 9 is a block diagram illustrating a wireless communication system supporting D2D communication according to one or more exemplary embodiments.

Referring to FIG. 9, eNB 900 includes a processor 905, a memory 910, and a Radio Frequency (RF) unit 915. The memory 910 is connected to the processor 905 and stores various information to operate the processor 905. The RF unit 915 is connected to the processor 905 and transmit and/or receive a wireless signal. The processor 905 is configured to implement functions, processes, and/or methods to perform operations of one or more exemplary embodiments and other implicit operations to be performed by the processor 905 in accordance with suggested inventive concepts. In one or more exemplary embodiments, operations of an eNB may be implemented by the processor 905.

The processor 905 may generate a D2D SA grant and a D2D data grant disclosed in the present specification, and may transmit the generated D2D SA grant and D2D data grant to a Tx UE 930 through an RF unit 915. The D2D SA grant and the D2D data grant may be included in the same or different (E)PDCCH and thereby transmitted to the Tx UE 930.

In addition, the processor 905 may generate a separate grant and may transmit the separate grant to the Tx UE 930 through the RF unit 915. The processor 905 may generate the separate grant based on an SR message or a BSR message received from the Tx UE.

The Tx UE 930 includes a processor 935, a memory 940, and an RF unit 945. The memory 940 is connected to the processor 935, and stores a variety of information for driving the processor 935. The RF unit 945 is connected to the processor 935, and transmits and/or receives a radio signal. The processor 935 embodies functions, processes, and/or methods proposed to perform an operation according to one or more embodiments. In the aforementioned embodiments, an operation of the Tx UE 930 may be configured by the processor 935.

The RF unit 945 receives the (E)PDCCH that carries the D2D SA/data grant. Also, the RF unit 945 receives the (E)PDCCH that carries the separate grant. The processor 935 may detect the (E)PDCCH based on blind decoding.

The processor 935 transmits D2D SA and/or D2D data to an Rx UE 960 through the RF unit 945 based on the D2D SA/data grant. In this case, the processor 935 may control the RF unit 945 to start repetitive transmission of SA#0 in a first MTO based on the D2D SA grant, and may control the RF unit 945 to start repetitive transmission of TB#0 in a second MTO.

Meanwhile, the processor 935 may configure an associated operation for data overriding based on the separate grant. In detail, for example, the processor 935 may control transmission of SA#0 to be replaced with transmission of SA#1 from a first point in time of the first MTO based on the data overriding, and may control transmission of TB#0 to be replaced with transmission of TB#1 from a second point in time of the second MTO based on the data overriding. In addition, the processor 935 performs data overriding determination and may configure an associated operation based on the data overriding determination.

Rx UE 960 includes a processor 965, a memory 970, and a Radio Frequency (RF) unit 975. The memory 970 is connected to the processor 965 and stores various information to operate the processor 965. The RF unit 975 is connected to the processor 965 and transmit and/or receive a wireless signal. The processor 965 is configured to implement functions, processes, and/or methods to perform operations of one or more exemplary embodiments and other implicit operations to be performed by the processor 965 in accordance with suggested inventive concepts. In one or more exemplary embodiments, operations of a UE may be implemented by the processor 965.

The RF unit 945 receives D2D SA and/or D2D data from the Tx UE 930. The RF unit 945 may receive at least two SAs in the first MTO for SA transmission. The RF unit 945 may receive at least two TBs in the second MTO for data transmission.

The eNB 900 includes a processor 905, a memory 910, and a Radio Frequency (RF) unit 915. The processor 905 may generate D2D scheduling assignment (D2D SA) grant and generate a D2D data grant. The RF unit 915 may transmit the generated D2D SA grant to a transmission (Tx) UE and transmit the generated D2D data grant to the Tx UE. The D2D SA grant enables the Tx UE to transmit an SA to a reception (Rx) UE through a D2D communication, and the D2D data grant enables the Tx UE to transmit a Transport Block (TB) to the Rx UE. The processor 905 may generate a separate grant for indicating data overriding, and the RF unit 915 may transmit the generated separate grant to the Tx UE. The separate grant enables the Tx UE to transmit an overriding data to the Rx UE.

The eNB 900 may receive a scheduling request (SR) message or a buffer state report (BSR) message from the Tx UE. The separate grant may be generated based on the SR message or the BSR message. The D2D data grant informs the Tx UE of transmitting TB#0 to the Rx UE in multiple transmission opportunity (MTO), where the TB#0 transfers D2D data. The separate grant may include an overriding flag bit indicating a transmission of TB#1 on the MTO.

The D2D data grant may include a resource pattern for transmission (RPT) for transmitting the TB#0 on the MTO. The separate grant indicates that the TB#1 is based on the RPT. The separate grant may include at least one of modulation coding scheme (MCS), transmission power command (TPC), and timing alignment (TA) as control information for the transmission of the TB#1.

The Tx UE 930 includes a processor 935, a memory 940, and an RF unit 945. Rx UE 960 includes a processor 965, a memory 970, and a Radio Frequency (RF) unit 975. The Tx UE 930 and the Rx UE 960 may have capabilities as both a Tx UE and an Rx UE.

An RF unit of a UE, e.g., the Tx UE 930 or the Rx UE 960, may receive D2D scheduling assignment (D2D SA) grant transmitted from an evolved NodeB (eNB) and receive a D2D data grant transmitted from the eNB. The D2D SA grant enables the Tx UE to transmit an SA to a reception (Rx) UE through a D2D communication, and the D2D data grant enables the Tx UE to transmit a Transport Block (TB) to the Rx UE. A processor of a UE may transmit, based on the D2D SA grant, SA#0 to the Rx UE on a first multiple transmission opportunity (MTO) with repetition; and transmit, based on the D2D data grant, TB#0 to the Rx UE on a second MTO with repetition. The radio frequency unit receives a separate grant for indicating data overriding. Based on the separate grant, the processor may command overriding of the transmission of SA#0 with SA#1 from a first time point in the first MTO. Further, the processor may command overriding of the transmission of TB#0 with TB#1 from a second time point in the second MTO.

The separate grant enables the Tx UE to transmit an overriding data to the Rx UE. The Tx UE may transmit a scheduling request (SR) message or a buffer state report (BSR) message to the eNB, and the separate grant may be generated based on the SR message or the BSR message. The separate grant may include an overriding flag bit indicating a transmission of TB#1 on the first MTO.

The D2D data grant may include a resource pattern for transmission (RPT) for transmitting the TB#0 on the MTO, and the separate grant may indicate that the TB#1 is based on the RPT. The separate grant may include at least one of modulation coding scheme (MCS), transmission power command (TPC), and timing alignment (TA) as control information for the transmission of the TB#1.

The first time point may be determined based on a timing relationship, which is associated with a subframe in which the separate grant is transmitted. The first time point may be $m^{th}$ subframe after the subframe in which the separate grant is transmitted, where m is an integer. The transmission of SA#1 may be indicated based on Demodulation Reference Signal.

The processors may include an application-specific integrated circuit (ASIC), another chipset, a logic circuit, and/or a data processing device. The memories may include a Read-Only Memory (ROM), a Random Access Memory (RAM), a flash memory, a memory card, a storage medium and/or another storage device. The RF units may include a baseband circuit for processing a wireless signal. When an embodiment is embodied as software, the described scheme may be embodied as a module (process, function, or the like) that executes the described function. The module may be stored in a memory, and may be executed by a processor. The memory may be disposed inside or outside the processor, and may be connected to the processor through various well-known means.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention.

What is claimed is:

1. A method of supporting a device-to-device (D2D) communication between user equipments (UEs), the method comprising:

generating, at an evolved NodeB (eNB), D2D scheduling assignment (D2D SA) grant associated with a transmission (Tx) UE;

transmitting the generated D2D SA grant to the Tx UE, the D2D SA grant enabling the Tx UE to transmit SA#0 to a reception (Rx) UE through a D2D communication, wherein the SA#0 is associated with first resources of a first multiple transmission opportunities (MTO) of a first period;

generating, at the eNB, a D2D data grant associated with the Tx UE;

transmitting the generated D2D data grant to the Tx UE, the D2D data grant enabling the Tx UE to transmit Transport Block #0 (TB#0) to the Rx UE, wherein the TB#0 is associated with second resources of a second MTO of the first period;

generating a separate grant for indicating overriding of the D2D SA grant, wherein the overriding replaces a scheduled transmission of the SA#0 in the first MTO of the first period with a transmission of SA-#1 in the first MTO of the first period, and wherein the SA#1 is associated with third resources, of the first MTO, that are different from the first resources; and transmitting, by the eNB and to the Tx UE, the generated separate grant, the separate grant enabling the Tx UE to transmit, via the third resource, the SA#1 to the Rx UE.

2. The method of claim 1, further comprising:
receiving a scheduling request (SR) message or a buffer state report (BSR) message from the Tx UE,
wherein the separate grant is generated based on the SR message or the BSR message.

3. The method of claim 1, wherein:
the D2D data grant informs the Tx UE of transmitting the TB#0 to the Rx UE in the second MTO;
the TB#0 transfers D2D data; and
the separate grant comprises an overriding flag bit indicating a transmission of Transport Block #1 (TB#1) on the second MTO.

4. The method of claim 3, wherein:
the D2D data grant comprises a resource pattern for transmission (RPT) for transmitting the TB#0 on the second MTO; and
the separate grant indicates that the TB#1 is based on the RPT.

5. The method of claim 3, wherein the separate grant comprises at least one of modulation coding scheme (MCS), transmission power command (TPC), and timing alignment (TA) as control information for the transmission of the TB#1.

6. A method of supporting a device-to-device (D2D) communication between user equipments (UEs), the method comprising:
receiving, at a transmission (Tx) UE, D2D scheduling assignment (D2D SA) grant transmitted from an evolved NodeB (eNB), the D2D SA grant enabling the Tx UE to transmit SA#0 to a reception (Rx) UE through a D2D communication, wherein the SA#0 is associated with first resources of a first multiple transmission opportunities (MTO) of a first period;
receiving, at the Tx UE, a D2D data grant transmitted from the eNB, the D2D data grant enabling the Tx UE to transmit a Transport Block #0 (TB#0) to the Rx UE, wherein the TB#0 is associated with second resources of a second MTO of the first period;
scheduling, based on the D2D SA grant, the transmission of the SA#0 on the first resources;
scheduling, based on the D2D data grant, the transmission of the TB#0 on the second resources;
receiving, at the Tx UE, a separate grant for indicating overriding of the D2D SA grant;
replacing, by the Tx UE and based on the separate grant, the scheduled transmission of SA#0 in the first MTO of the first period with a transmission of SA#1 in the first MTO of the first period, wherein the SA#1 is associated with third resources, of the first MTO, that are different from the first resources;
transmitting, by the Tx UE and to the Rx UE, the SA#1 via the third resources; and
transmitting, by the Tx UE and to the Rx UE, TB#1 via fourth resources of the second MTO.

7. The method of claim 6, further comprising:
replacing the scheduled transmission of TB#0 with a transmission of TB#1,
wherein the separate grant enables the Tx UE to transmit, to the Rx UE, the TB#1 in replacement of the TB#0.

8. The method of claim 7, further comprising:
transmitting a scheduling request (SR) message or a buffer state report (BSR) message to the eNB,
wherein the separate grant is generated based on the SR message or the BSR message.

9. The method of claim 7, wherein:
the separate grant comprises an overriding flag bit indicating a transmission of the TB#1 on the second MTO.

10. The method of claim 7, wherein:
the D2D data grant comprises a resource pattern for transmission (RPT) for transmitting the TB#0 on the second MTO; and
the separate grant indicates that the TB#1 is based on the RPT.

11. The method of claim 7, wherein the separate grant comprises at least one of modulation coding scheme (MCS), transmission power command (TPC), and timing alignment (TA) as control information for the transmission of the TB#1.

12. The method of claim 6, wherein the replacement of the scheduled transmission of SA#0 with the transmission of SA#1 occurs in $m^{th}$ subframe after the subframe in which the separate grant is transmitted, where m is an integer.

13. The method of claim 6, wherein the transmission of SA#1 is indicated based on Demodulation Reference Signal (DM-RS).

14. An evolved NodeB (eNB) to support a device-to-device (D2D) communication between user equipments (UEs), the eNB comprising:
a processor configured to generate D2D scheduling assignment (D2D SA) grant associated with a transmission (Tx) UE and generate a D2D data grant associated with the Tx UE; and
a transmitter to transmit, to the Tx UE, the generated D2D SA grant and the generated D2D data grant, the D2D SA grant enabling the Tx UE to transmit SA#0 to a reception (Rx) UE through a D2D communication, the D2D data grant enabling the Tx UE to transmit Transport Block #0 (TB#0) to the Rx UE, wherein SA#0 is associated with first resources of a first multiple transmission opportunities (MTO) of a first period, and wherein the TB#0 is associated with second resources of a second MTO of the first period,
wherein the processor is configured to generate a separate grant for indicating overriding of the D2D SA grant, wherein the overriding replaces a scheduled transmission of the SA#0 in the first MTO of the first period with a transmission of SA#1 in the first MTO of the first period, and wherein the SA#1 is associated with third resources, of the first MTO, that are different from the first resources, and
wherein the transmitter transmits, to the Tx UE, the generated separate grant, the separate grant enabling the Tx UE to transmit, via the third resources, the SA#1 to the Rx UE.

15. A transmission user equipment (Tx UE) to perform a device-to-device (D2D) communication with a reception UE (Rx UE), the Tx UE comprising:
a transmitter;
a receiver to receive D2D scheduling assignment (D2D SA) grant transmitted from an evolved NodeB (eNB) and receive a D2D data grant transmitted from the eNB, the D2D SA grant enabling the Tx UE to transmit SA#0 to a reception (Rx) UE through a D2D communication, the D2D data grant enabling the Tx UE to transmit a Transport Block #0 (TB#0) to the Rx UE, wherein the SA#0 is associated with first resources of a first multiple transmission opportunities (MTO) of a first period, and wherein the TB#0 is associated with second resources of a second MTO of the first period; and a processor configured to schedule, based on the D2D SA grant the transmission of SA#0 on the first resources and schedule, based on the D2D data grant, the transmission of TB#0 on the second resources, wherein: the receiver receives a separate grant for indicating overriding of the D2D SA grant;

based on the separate grant, the processor is configured to replace the scheduled transmission of SA#0 in the first MTO of the first period with a transmission of SA#1 in the first MTO of the first period;

the SA#1 is associated with third resources, of the first MTO, that are different from the first resources; and the transmitter transmits, to the Rx UE, the SA#1 via the third resources and TB#1 via fourth resources of the second MTO.

16. The Tx UE of claim 15, wherein the processor is configured to replace the scheduled transmission of TB#0 with a transmission of TB#1; and wherein the separate grant enables the Tx UE to transmit, to the RX UE, the TB#1 in replacement of TB#0.

17. The Tx UE of claim 15, wherein:

the separate grant comprises an overriding flag bit indicating a transmission of the TB#1 on the second MTO.

18. The Tx UE of claim 15, wherein:

the D2D data grant comprises a resource pattern for transmission (RPT) for transmitting the TB#0 on the second MTO; and the separate grant indicates that the TB#1 is based on the RPT.

* * * * *